J. G. MACLAREN.
PNEUMATIC DESPATCH APPARATUS.
APPLICATION FILED JAN. 26, 1918.
1,396,449.
Patented Nov. 8, 1921.
5 SHEETS—SHEET 1.
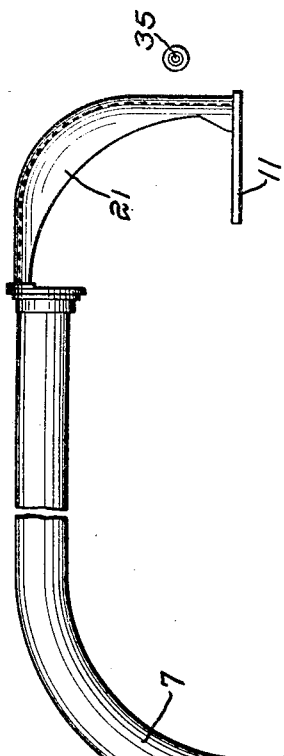
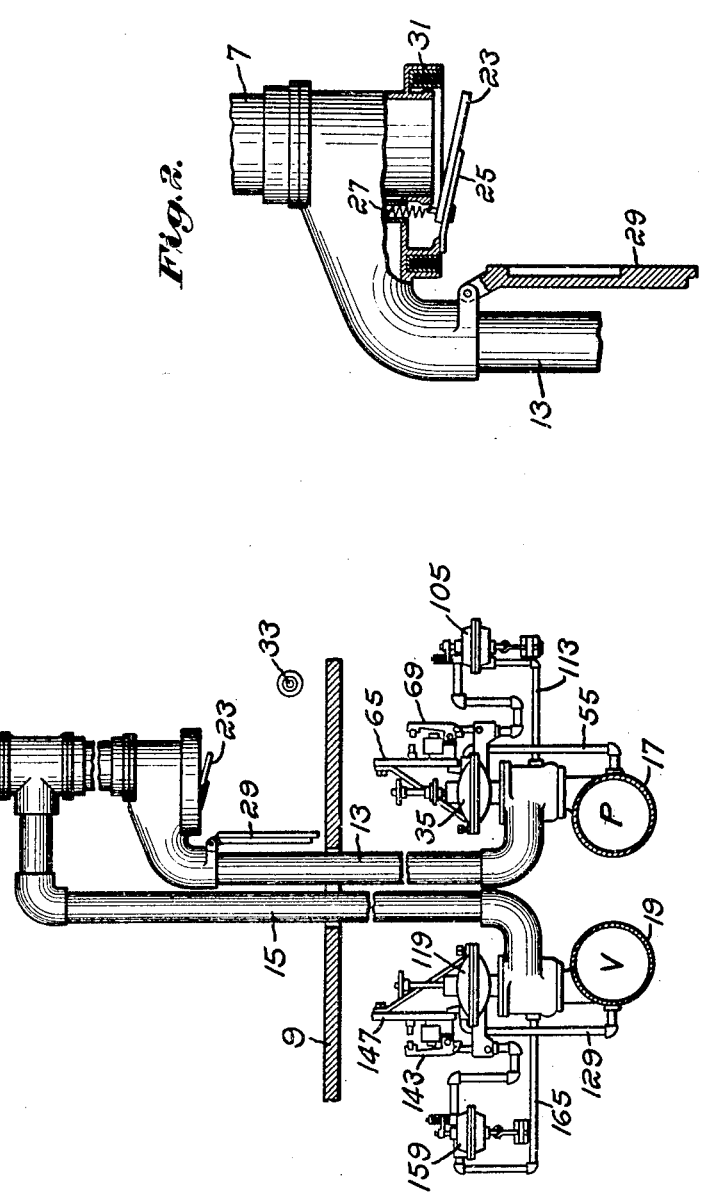
Inventor:
James G. Maclaren,
by Emery, Booth, Janney & Varney
Attys.

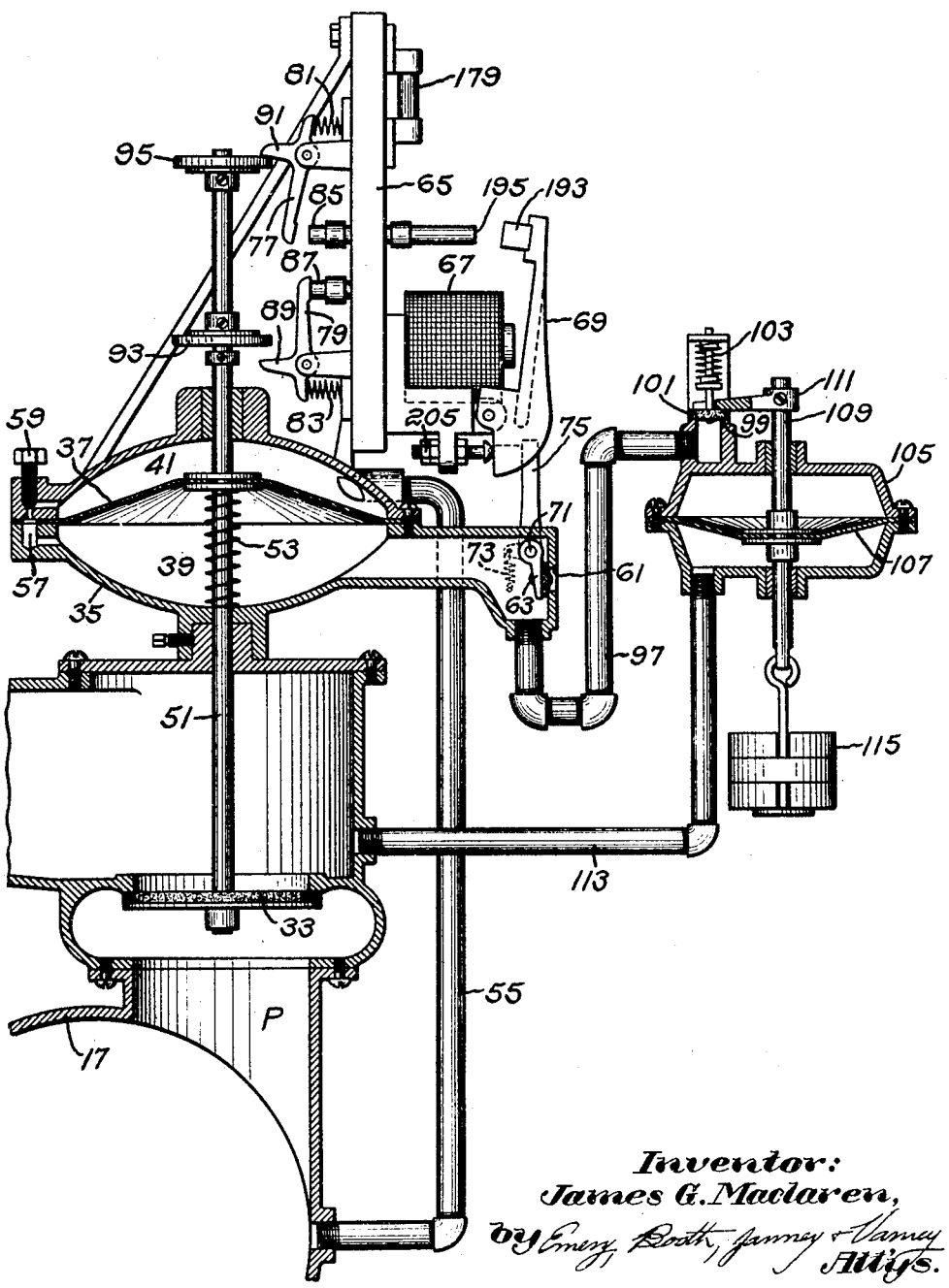

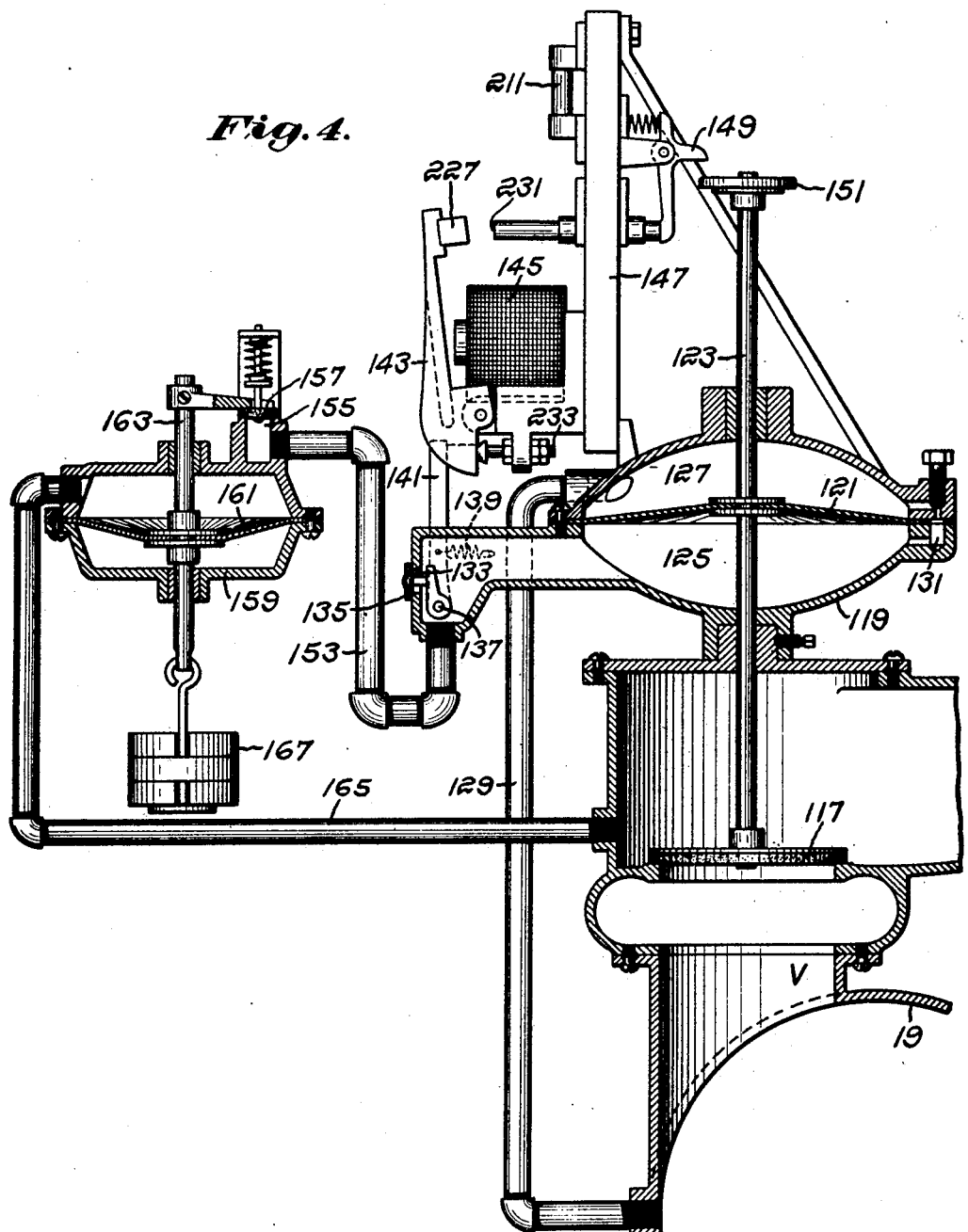

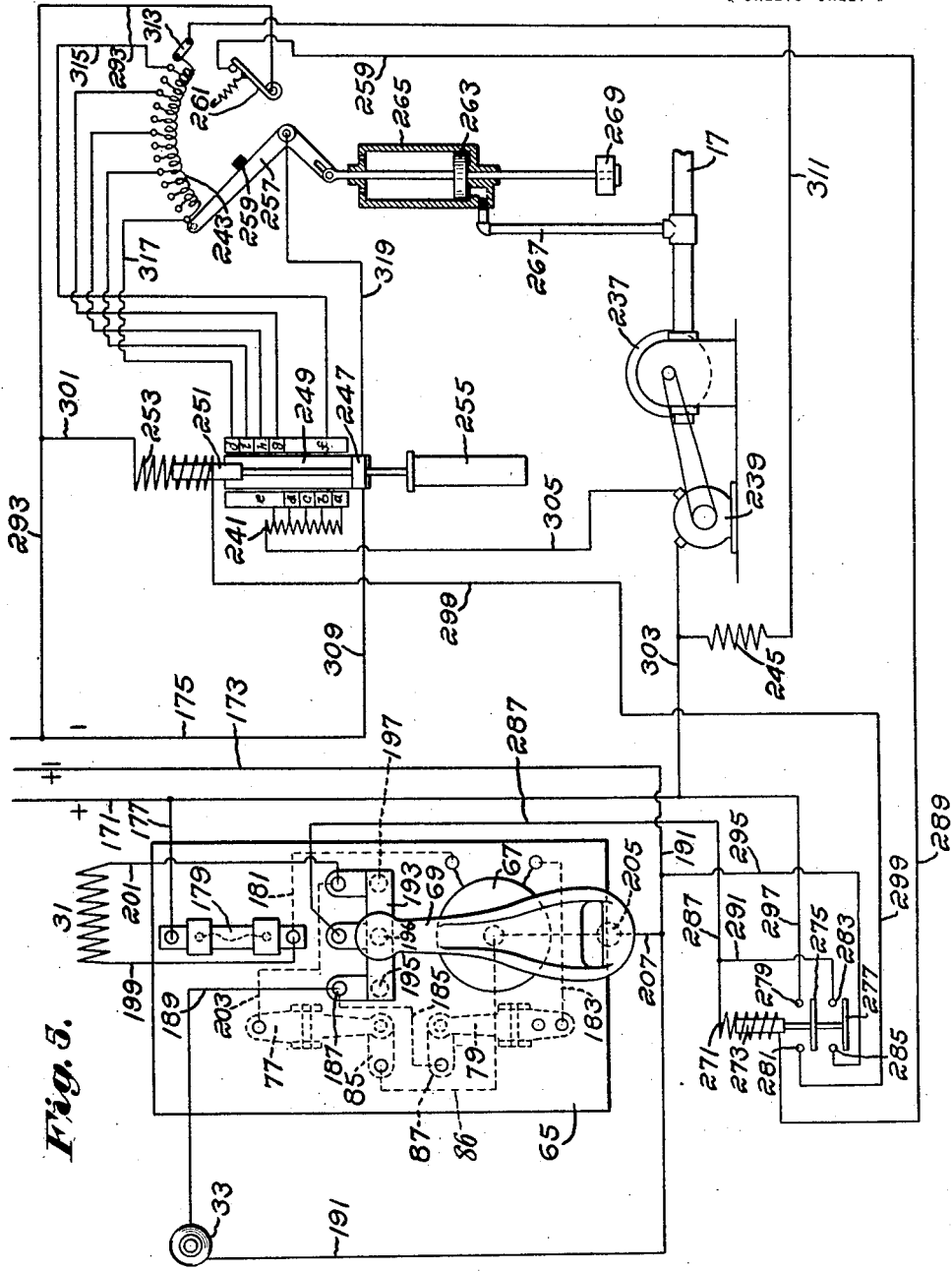

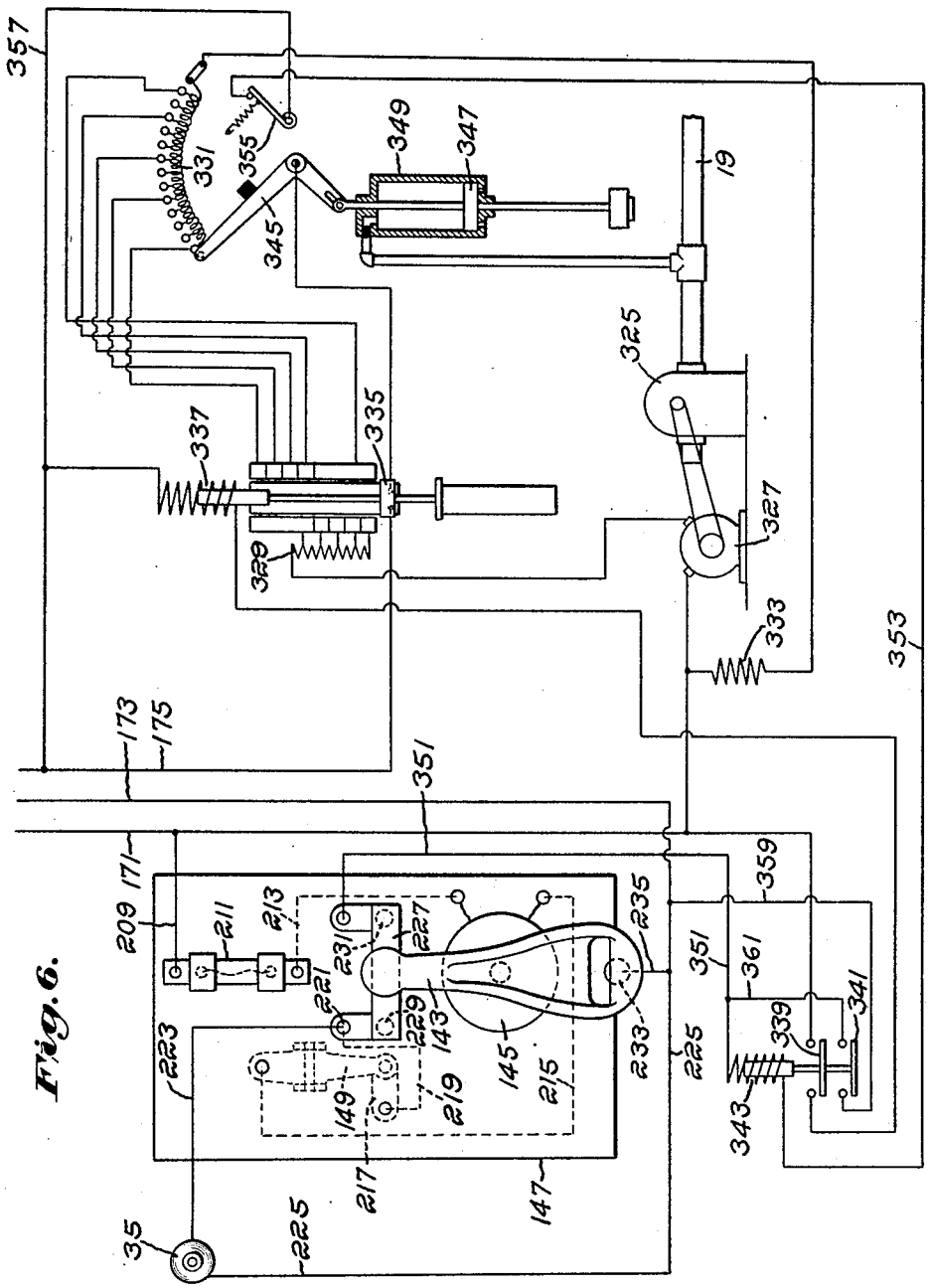

UNITED STATES PATENT OFFICE.

JAMES G. MACLAREN, OF MAMARONECK, NEW YORK.

PNEUMATIC-DESPATCH APPARATUS.

1,396,449.   Specification of Letters Patent.   Patented Nov. 8, 1921.

Application filed January 26, 1918. Serial No. 213,836.

*To all whom it may concern:*

Be it known that I, JAMES G. MACLAREN, a citizen of the United States, and resident of Mamaroneck, Westchester county, State of New York, have invented an Improvement in Pneumatic-Despatch Apparatus, of which the following description, in connection with the accompanying drawings, is a specification, like characters on the drawings representing like parts.

This invention relates to pneumatic despatch apparatus such as is used, for example, in stores for the transmission of cash and sales slips and the object is to provide an improved system of this nature.

This application constitutes a continuation in part of my former copending application Serial No. 867,691, filed October 21, 1914.

My invention will best be understood by reference to the following description of an illustrative embodiment thereof taken in connection with the accompanying drawings wherein:

Figure 1 is a partly diagrammatic view of the system showing a single transit tube;

Fig. 2 is a detail, partly in section, showing the end of the tube at the main or central station;

Fig. 3 is a view, chiefly in section, of the presure controlling mechanism on the pressure side for operating the carriers by positive pneumatic pressure;

Fig. 4 is a similar view of the apparatus on the vacuum side for operating carriers by negative or sub-atmospheric pressure;

Fig. 5 is a wiring diagram showing the control for the pressure side of the apparatus and the controlling means for the compressor operating the same; and Fig. 6 is a similar view of the vacuum side.

Referring to Fig. 1, I have there shown a single line of transit tube 7 extending between a main or central station 9 and a branch or sub-station 11, the system chosen for purposes of illustration being one wherein carriers may be despatched in either direction through a single tube. Opening laterally into the transit tube 7 above the central station terminus thereof are connecting pipes 13 and 15 by which it may be placed in connection with pressure conduits 17 and 19, the communication being controlled by suitable valve mechanism illustrated in Fig. 1 and hereinafter more fully to be described. Herein the conduit 17 is a source of positive pressure, that is, the air therein is at a pressure higher than that of the atmosphere or has a positive potential in relation thereto. The conduit 19 is a source of negative or sub-atmospheric pressure or vacuum. In other words, the air has a negative potential as regards the atmosphere. This is indicated on the drawings by the symbols P and V applied to the conduits.

In the system disclosed as an example of my invention the carrier is adapted to be drawn from the sub-station 11 to the main station 9 by reduction of the pressure in front of it, caused by placing the tube in communication with the conduit 19, and a carrier is despatched from the main station 9 to the sub-station 11 by pressure delivered from the conduit 17 to the rear of the same, the carrier being discharged against the usual chute 21.

Referring to Fig. 2, the main station terminal of the transit tube is provided with a valve 23, conveniently of leather and hinged thereto by a leather hinge 25 to close inwardly over the same. The valve normally takes the position shown in Fig. 2, being prevented from falling farther by the spring 27 secured thereto near the hinge. A door 29 of iron is adapted to close over the end of the tube and the valve, and about the mouth of the tube is provided a coil 31 which may be electrically energized in a manner hereinafter to be described. When the door is closed and the coil is energized, the door will act as an armature of a magnet and be held in position, thereby preventing opening of the valve 23.

When a carrier is drawn inwardly from the substation 11, the reduction of pressure in the transit tube 7 closes valve 23 until the carrier displaces the same when discharged at the main station. To despatch a carrier from the main station, it is inserted past the valve and the door 29 is closed. The controlling mechanism hereinafter to be described which admits pressure from the conduit 17 to the tube to move the carrier therein also acts to energize the coil 31 and thus holds the door 29 raised and prevents the pressure from escaping through the terminal of tube 7.

While the admission of the respective positive and negative pressures to the tube 7 may be initiated in any suitable manner upon the introduction of the carriers to the tube, I have herein shown, by way of example, manually controlled means; and since the device chosen for purposes of illustration is an electrically controlled device, such manually controlled means takes the form of circuit closers 33 and 35 at the main and branch stations respectively, such circuit closers being herein illustrated as push buttons. The manner in which the mechanism is controlled by these push buttons will more fully appear as the details of the apparatus shown are described.

Having thus described in a general way the system illustrated in Fig. 1, I shall next, referring more particularly to Fig. 3, describe the control mechanism herein illustrated for controlling admission of positive pressure from the conduit 17 to the transit tube 7. For this purpose there is provided a valve 33 which may be moved by suitable pressure sensitive mechanism. Herein this mechanism takes the form of a so-called diaphragm motor and may comprise a casing 35 divided by a diaphragm 37 into upper and lower pressure receiving chambers 39 and 41. The valve stem 51 is secured to diaphragm 37 and consequently is subjected to the pressures in the opposed chambers 39 and 41 and if there is a difference between these pressures the valve will tend to be moved thereby, as will be well understood. A suitable spring 53 is preferably provided surrounding the valve stem and interposed between the casing 35 and the diaphragm 37 and normally tending to thrust the diaphragm upwardly and thus to hold the valve 33 closed on its seat.

The chamber 41 is preferably in communication with a source of pressure tending to move the diaphragm and herein I have illustrated a pipe 55 leading from the pressure conduit 17 and opening to the chamber. I herein provide in the casing 35 of the diaphragm motor a passage 57 of small dimension connecting the chambers 41 and 39. The size of this passage may be regulated by the needle valve 59. This passage permits the pressure introduced in chamber 41 by pipe 55 to bleed therethrough into chamber 39 whereby the pressure of the chambers is normally equalized and the diaphragm is held raised and the valve 33 closed. To operate the valve means are provided to nullify the pressure potential in chamber 39 more quickly than it can be restored through the passage 57 and in the present example the casing is provided with an exhaust port 61 controlled by valve 63 which when opened places the lower chamber 39 in communication with the atmosphere, thereby causing the pressure therein to fall and creating a differential of pressure in favor of chamber 41. The diaphragm 37 will therefore be drawn downwardly and the valve 33 opened, and air under pressure will pass from conduit 17 to the transit tube.

In the present embodiment of the invention the valve 63 is operated by electric mechanism and, referring to Fig. 3, I shall next describe certain of the mechanical parts of that mechanism, disregarding for the time being the electrical circuits. As there shown, a panel board 65 is mounted adjacent the diaphragm motor and on this panel board is mounted an electro-magnetic device for operating the valve 63. The device is herein exemplified by a magnet 67 having a pivoted armature 69. The valve 63 may be mounted on a rock shaft 71 and normally held closed by a spring 73 attached to an arm on said shaft exterior to the casing. Herein another arm 75 is adapted to be operated on energization of the magnet to open the valve. This arm is normally in contact with the end of the pivoted armature 69 and when this armature swings inwardly, counter-clockwise viewing Fig. 3, the short end thereof will act as a lever to swing the arm 75 clockwise and thus open the valve.

I will also briefly describe the other mechanisms shown on the panel board 65, although their purpose and operation will be better understood when the electrical circuits passing through the same are described. Contactors 77 and 79 are provided in the form of pivoted levers pressed by springs 81 and 83 and normally making contact with contacts 85 and 87. Arms 89 and 91 on these contactors extend in the path of lower and upper collars 93 and 95 provided on the upper end of the valve stem 51 and the contactors are therefore adapted to be opened against the force of the springs 81 and 83 when the valve stem moves. As seen in Fig. 3, when the valve 33 is closed the collar 95 normally holds contactor 77 open, but the collar 93 is not in contact with the arm 89 and the contactor 79 is closed against contact 87.

When the controlling means for the pressure panel, such as the push button 33 (shown in Fig. 1) is operated a circuit is formed through contactor 79 energizing magnet coil 67 and attracting armature 69 and opening valve 61. The valve 33 will then open, drawing downwardly the valve stem 51. This will throw open the contactor 79 and break the magnetic circuit. If a push button is used, as herein disclosed, a retaining circuit is preferably arranged to allow the magnet to remain energized even after the push button is released, and this retaining circuit also passes through contactor 79. I do not attempt to explain this retaining circuit in this place as it will be more clearly understood when the wiring is traced in detail. As the valve stem 51 descends, the collar 95 will be drawn away from arm 91 and permit contactor 77 to close against contact 85. This connection will control a circuit to the coil 31 shown in Fig. 2, and as explained, the door 29 will be held closed until the valve stem, again rising when the admission of pressure to the transit tube is terminated, rocks the contactor 77 and breaks the circuit.

It will be noted that in the structure described the means which open the valve 33 act only during the lifting of the same. Any suitable means may be provided for retarding the closing of valve 33 but in the present instance I have illustrated a pressure sensitive mechanism controlled by the conditions of pressure in the transit tube, which conditions vary accordingly as whether a carrier is in the tube or not. Such means I will now describe. Beside the exhaust port 61, the casing 35 is in communication through a pipe 97 with the atmosphere through a port 99 normally closed by a valve 101 pressed by a spring 103. In the present instance when the valve 63 closes, the valve 101 is allowed to open and maintain the operating pressure differential in the two chambers 39 and 41, provided a carrier is in transit, and when normal pressure conditions in the transit tube are reëstablished after the carrier is discharged, the valve 101 will close to permit the pressure in the two chambers 39 and 41 to be equalized through bleeding passage 57, thus to close the main valve 33. The pressure sensitive mechanism herein disclosed is of the diaphragm motor type and includes a casing 105 having a diaphragm 107 adapted to move rod 109 which carries a forked arm 111 for operating valve 101, the forked arm embracing the valve stem as seen in the figure. Pressure from the transit tube is admitted to the casing 105 beneath the diaphragm through a pipe 113 and will tend to raise the diaphragm and, through rod 109, open the valve 101. The normal pressure which will be created in the empty transit tube by placing the same in communication with pressure conduit 17 is, however, balanced, herein by means of a weight 115 suspended on rod 109, and the valve 101 is therefore normally closed. When, however, a carrier is in transit, the pressure will be somewhat increased as a carrier does not move as rapidly as does the air in the tube except under peculiar conditions which for the present purpose may be disregarded. When a carrier is in the tube, therefore, the pressure underneath the diaphragm 107, tending to raise the same, is somewhat greater than the force of weight 115 tending to hold the same depressed. The rod 109 will, therefore, rise and open valve 101, thus providing a vent for the lower pressure chamber 39. There will thus be an excess of pressure in the upper chamber 41 to hold the main valve 33 open as long as the carrier is in the transit tube, but when it is discharged the pressure underneath diaphragm 107 will drop and the diaphragm will be drawn down by the weight 115, thus closing valve 101. Pressure between the chambers 41 and 39 will then be gradually equalized through the bleeding passage 57, the spring 53 will lift diaphragm 37 and main valve 33 will close.

In Fig. 4 I have illustrated the mechanism controlling the sub-atmospheric pressure conduit 19. To control this conduit a main valve 117 is provided, similar to the main valve 33, but which, however, rises instead of falling when it is opened. This valve may also be controlled by a diaphragm motor similar to the one on the pressure side and including a casing 119 divided by diaphragm 121 secured to stem 123 of the valve, which diaphragm provides two pressure receiving chambers 125 and 127. A pipe 129 places the upper chamber 127 in communication with conduit 19 and the two chambers are connected by a bleeding passage 131 similar to the passage 57.

Pressure in the chamber 127 will be reduced below that of the atmosphere because of the connection with the negative pressure conduit 19, but this pressure will normally be equalized by the bleeding passage 131 and the valve 117 will normally remain closed. If, however, the negative potential in the lower chamber is nullified, as by opening the same to the atmosphere, the diaphragm 121 will expand upwardly raising the main valve 117. As in the case of the pressure mechanism, a port 133 is provided in the casing 119 closed by a valve 135, the valve being mounted on a rock shaft 137 and normally held closed by a spring 139. An arm 141 on the rock shaft is operated by armature 143 of magnet 145 mounted on panel 147, these parts being similar to the corresponding parts in the pressure controlling mechanism. A contactor 149 is also provided coöperating with a collar 151 on valve stem 123, this contactor corresponding to the contactor 79 of the pressure panel. There is no need for any contactor corresponding to 77, as when the carrier is drawn by negative pressure from the sub-station to the main station it is not necessary to energize coil 31 (Fig. 2) to hold valve 23 closed. As the main valve 117 opens the collar 151 will throw open contactor 149, thereby deënergizing magnet 145 and permitting valve 135 to close.

The lower chamber 125 of casing 119 may be placed in communication with the atmosphere through a pipe 153 communicating with a port 155 normally closed by a valve 157, these parts corresponding to the parts 97, 99 and 101 shown in Fig. 3. The valve 157 is also controlled by a pressure sensitive mechanism, herein shown as comprising a casing 159 in which is a diaphragm 161 controlling the movements of a valve operating rod 163. The sub-atmospheric pressure of the transit tube is admitted through a pipe 165 to the upper side of diaphragm 161 and the tendency of this suction to raise the diaphragm is balanced by weights 167 suspended on the rod 163. When a carrier is in transit in the tube the pressure will be less than when there is no carrier in the tube and therefore, as before, the presence of the carrier in the tube will govern the pressure sensitive device which controls valve 157 and permit the diaphragm 161 to lift weight 167 and open the valve. The lower chamber 125 of the main diaphragm motor is thus kept in communication with the atmosphere while the carrier is in transit.

I shall next refer to Fig. 5 and describe the circuits for the pressure panel which operate the mechanism hereinbefore referred to. In the example shown, electrical energy is supplied by a three-wire system including a positive line 171, a neutral or intermediate line 173 and a negative line 175 which appear vertically just to the right of panel 65 in the figure. When the push button 33 at the main station, shown in the diagram of Fig. 5 at the extreme left, is closed the following circuit will energize magnet coil 67 and attract armature 69. Starting at the main line 171, through wire 177, fuse 179, wire 181, coil 67, wire 183, contactor 79, contact 87, wire 185, post 187, wire 189, push button 33, wire 191 and thence to intermediate line 173.

The attraction of the armature 69 will cause a bridge contact 193 carried by the same (see Fig. 3) to connect contacts 195, 196 and 197 (Fig. 5), thus permitting other circuits presently to be described to be completed when the magnet is energized.

Closing the push button 33 will also energize the coil 31 shown in Fig. 2 and appearing in the diagram just above the panel 65. This circuit of the coil comprises positive line 171, wire 177, fuse 179, wire 199, coil 31, wire 201, contact 197, bridge contact 193, contact 195, wire 189, push button 33, wire 191 and neutral line 173.

When the push button 33 is released the energizing circuit for magnet 67 just described is broken and a holding circuit is therefore provided which starts from positive line 171 and leads through wire 177, fuse 179, magnet coil 67, wire 183, contactor 79, wire 185, contact 195, bridge 193, armature 69, post 205, (see Fig. 3). The current passes through the hinge of the armature, wires 207 and 191 to intermediate line 173.

When the valve in opening throws open contactor 79 (see Fig. 3), the magnet holding circuit just described will be broken, magnet coil 67 will be deënergized, the armature will swing outwardly to the position shown in Fig. 3, and the bridge contact 193 will be removed from contacts 195, 196 and 197. This will break the circuit above described which energizes coil 31, but prior to the opening of contactor 79 the collar 95 (Fig. 3), moving away from arm 91, permits contactor 77 to close and another circuit is formed through coil 31 energizing the same until broken by the reopening of contactor 77 when the valve again closes. This circuit starts from main line 171, passes through wire 177, fuse 179, wire 199, coil 31, wire 201, wire 203, contactor 77, contact 85, wire 86, post 205, wire 207, thence along wire 191 to intermediate line 173. The valve 23 (Figs. 1 and 2) will thus remain closed until the timing devices such as the diaphragm motor 105 (Fig. 3) permit the main valve to close and open contactor 77.

Referring to Fig. 6, I shall next describe the like circuits for the negative pressure panel 147. When the push button is closed the magnet is energized by a circuit from positive line 171, through wire 209, fuse 211, wire 213, coil 145, wire 215, contactor 149, contact 217, wire 219, post 221, wire 223, push button 35 and wire 225, back to neutral line 173. The armature 143 of the magnet is provided with a bridge contact 227 adapted to connect contacts 229 and 231 in the same manner as the contact 193 of the pressure panel connects contacts 195 and 197 (see Fig. 4). The holding circuit is the same as far as post 221 and leads thence through contact 229, bridge 227, armature 143, post 233 (Fig. 4), wires 235 and 225 to line 173.

Referring again to Fig. 5, pressure is maintained in the pressure conduit 17 by means of a suitable compressor 237 actuated by any desirable form of driving motor, an electric motor 239 being herein illustrated. Means are provided for controlling the driving action of the motor and herein its driving action is gradually augmented when the system is put into operation by means of the operating device exemplified by the push button 33. Preferably means are also provided for gradually abating this action as the pressure in the conduit rises. I shall first describe this controlling means as applied to the electric motor illustrated, disregarding the electric circuits and the means by which they are controlled.

For controlling the speed of the motor, there is provided an armature resistance 241 connected in steps to contacts $a, b, c, d$ and $e$ and resistance 243 (at the right of the diagram) in circuit with the field 245 of the motor and connected in steps to the contacts $f, g, h, i$ and $j$. Means are provided energizing the motor comprising a movable shoe 247 in electrical contact with a block 249 behind the same and along which it moves, said shoe also being adapted to make connection with one element of each set of the contacts $a$ to $j$. The shoe 247 is secured to the core 251 of a solenoid 253. The solenoid is adapted to draw the shoe 247 upwardly over the lettered contacts, energizing the field 245 through the contact *f*, while the armature is energized through contacts *a, b, c, d*, in turn, and then through the contacts *g, h, i, j*, while the armature is energized through *e*. Connected to the shoe is a retarding cylinder or dashpot 255 which while permitting the rapid descent of the solenoid core 251 and the parts attached thereto will enforce a slow upward movement thereof. When the system is put into operation by closing the push button 33, the solenoid is energized in the manner hereinafter to be described and the shoe 247, sweeping over the contacts *a, b, c, d* and *e*, gradually cuts out the armature resistance of the motor and thereafter moving in succession over *g, h, i, j*, gradually throws in field resistance until the motor is running at full speed. To abate the driving action of the motor as the pressure in the conduit rises and finally to stop the same, means are provided governed by this pressure and include a pivoted arm 257 adapted to sweep over a series of contacts associated with the resistance 243 and shown but not lettered in the drawing, the movement of this arm in a clockwise direction, viewing the diagram, and its coöperation with successive contacts serving to cut out resistance from the field of the motor. At its limit of clockwise travel a projection 259 thereon serves to throw open switch 261 which, as hereafter described, deënergizes the motor controlling means and permits the motor to stop.

For actuating the arm 257 a pressure sensitive device is provided exemplified herein by a piston 263 in a cylinder 265. Pressure from the conduit 17 is admitted through pipe 267 to the lower side of the piston which, through a weight 269 attached thereto, offers suitable resistance to such pressure. As the pressure in the conduit rises beyond the limit determined by the weight 269, the piston 263 will rise, rocking the arm 257, gradually cutting out more and more resistance from the field of the motor and thus abating its driving action and finally interrupting the circuit of the motor controlling means entirely, which causes shoe 247 to fall and the motor to stop.

I shall next describe the circuits by which the motor controlling mechanism just described is governed and operated. For this purpose a pilot solenoid 271, shown at the lower lefthand of the diagram, is utilized, movement of the core 273 of this solenoid operating two bridge contacts 275 and 277 attached thereto, contact 275 connecting contacts 279 and 281, and 277 connecting 283 and 285. The contacts 279 and 281 control a motor operating circuit as hereinafter explained. When the push button 33 is closed a circuit will be completed from neutral line 173 through wires 191 and 207, armature 69, contact 196, wire 287, solenoid 271, wire 289, switch 261 and wire 293 to negative line 175. As this circuit is broken when the armature falls away upon deënergization of the magnet, a retaining circuit is provided this circuit being closed by the bridge contact 277 on the lifting of the solenoid core 273. The circuit is as follows: from intermediate line 173, through wires 191 and 295 and contact 285, over bridge contact 277 to contact 283, thence by wire 291 to solenoid 271 and by wire 289, switch 261 and wire 293 to the negative line 175. The solenoid will thus remain energized until the switch 261 is thrown open.

When the solenoid 241 is energized it raises the bridge contact 275 and completes another circuit which will now be described. This circuit is adapted to control the motor by exciting solenoid 253 and starts from line 171, passes through wire 297, contact 279, bridge 275, contact 281, wire 299, to solenoid 253, wires 301 and 293 to line 175.

The motor circuits are as follows:—for the armature, from line 171, wire 303, to the armature 239, thence by wire 305 to the armature resistance 241, to one of the contacts *a, b, c, d* and *e*, shoe 247, block 249 and wire 309, to negative line 175. The field circuit will be first described as it is when the shoe 247 is in the position shown in the drawings. From the wire 303 the current passes through the field 245, wire 311, contact 313, wire 315, contact *f*, shoe 247, block 249 and wire 309 to line 175. As the shoe rises under the influence of the solenoid 223, it lifts contact *f* and makes connection with one of the other contacts *g* to *j*. Supposing, for example, that it is in contact with *j*, the circuit will then lead from contact 313 through resistance 243 and wire 317 to contact *j*, shoe 247, block 249, and thence to the negative line. The motor will then be running at its highest speed and as the pressure in the conduit rises the arm 257 will be swung clockwise as already explained. Supposing the arm to have assumed a substantially vertical position, the circuit will then be from contact 313 through substantially half of the resistance 243 and through arm 257, wire 319 to block 249, and thence as before. When the arm is swung completely over, the projection 259 throws open switch 261. This breaks the circuit leading through contacts 285 and 283. This is the holding circuit for solenoid 271 which is therefore deënergized, permitting its core to drop and move bridge 275 from contacts 279 and 281. This breaks the energizing circuit for solenoid 253, the shoe 219 drops, the motor circuit is interrupted and the motor stops.

Fig. 6 shows diagrammatically the controlling mechanism for the negative pressure or vacuum side of the apparatus. A suitable exhauster 325 is provided which may be driven by an electric motor 327 controlled substantially as is the motor 239 of the pressure side. I shall not attempt to describe the diagram in detail as it does not essentially differ from the diagram for the pressure side, there being an armature resistance 329 and a resistance 331 in series with the field 333 of the motor. The speed of the motor may be increased automatically by the drawing up of a shoe 335 by means of a solenoid 337, these parts corresponding to parts 247 and 253 on the pressure side. The controlling mechanism is put into operation by means of bridge contacts 339 and 341 shown at the lower lefthand part of the figure and actuated by a pilot solenoid 343. As the pressure rises the speed of the motor may be decreased by movement of the arm 345 over contacts connected with the field resistance 331, movement of this arm being effected through a piston 347 working in a cylinder 349 which is in communication with the conduit 19. The action is similar to that of the cylinder 265 on the pressure side, but the connecting pipe enters the cylinder above the piston instead of below, so that a decrease of pressure in the conduit 19 will cause the piston to rise and cut out a part of the resistance 331.

I do not deem it necessary to trace in detail all the circuits as they are like those already described in detail for the motor operating the compressor. I shall, however, trace the circuits for the pilot solenoid 343. When the push button 35 is closed to rock armature 143, an energizing circuit for the solenoid will be completed as follows: line 173, wires 225 and 235, post 233, armature 143, contact 231, wire 351, solenoid 343, wire 353, switch 355, and wire 357 to the line 175. When the armature is released by throwing open of the contactor 149 (Fig. 4), there is still a holding circuit for the solenoid as follows:—from line 173 and wires 225 and 359, through the lower set of contacts by means of the bridge 341, wire 361, solenoid 343, wire 353, switch 355 and wire 357 to the negative line 175. This circuit will be broken by the opening of the switch 355 as described on the pressure side in connection with the switch 261.

I shall next briefly review the operation of the device and in doing so will refer solely to the pressure side, as the operation of the vacuum side is similar.

Referring to Fig. 1, an operator at the station 9 wishes to despatch a carrier to the branch station 11. The valve 23 is drawn down, a carrier inserted and the door 29 closed and held temporarily closed by hand. The button 33 is then depressed. The closing of this button effects three functions: it energizes coil 31 holding the door 29 closed, opens main valve 33 to admit fluid under pressure from conduit 17 through pipe 13 to the transit tube 7 to drive the carrier therealong and energizes pilot solenoid 271 to start the motor which drives the compressor. Referring to Fig. 3, the closing of the button will rock armature 69 which through arm 75 will open valve 63. This permits the lower chamber 39 of the diaphragm motor to exhaust to the atmosphere faster than the pressure can be equalized through passage 57. Consequently there will be a greater pressure in the upper chamber 41 and the diaphragm will descend opening valve 33 and admitting pressure from conduit 17 to the transit tube. A suitable holding circuit for the armature, as already described, is provided so that the operator need not keep the push button depressed but can release it in the usual manner. The closing of the armature also makes a circuit to the coil 31 which attracts the door 29 and relieves the operator of the duty of holding the same closed.

As the valve 33 opens the collar 95 will first leave arm 91 and permit contactor 77 to close. This will close another circuit for the coil 31 independent of the armature 69, the circuit through the armature being presently interrupted as will next be described. As the valve continues to descend the collar 91 coming in contact with arm 89 will open contactor 79 and deënergize magnet 67. Armature 69 can then fall back to the position shown in the figures and the valve 63 will be closed.

Any suitable timing devices are applicable to prevent too early closing of the main valve 33 after magnet 67 has been deënergized as described. Herein the supplementary exhaust port 99 is provided for chamber 35, the port having a valve 101 controlled by diaphragm motor 105 as already described. The arrangement is such that while a carrier is in transit the resulting excessive pressure in the transit tube acts on the lower side of diaphragm 107 and lifts valve 101 from its seat. When on discharge of the carrier the pressure falls, the valve will close again and chamber 39 no longer has any vent. Consequently the pressure in chambers 39 and 41 is equalized through passage 57 and the main valve 33 closes. In closing collar 95 will throw open contactor 77, deënergizing coil 31 and releasing the door 29.

Referring next to Fig. 5, it will be understood that when the push button 33 is depressed solenoid 271 is energized, thus lifting the bridge contacts 275 and 277, and by a suitable holding circuit for the solenoid through contact 277 as already described they are maintained in position even when the push button 33 and armature 69 are released. By the circuit closed by bridge contact 275, solenoid 253 is energized which, lifting shoe 247, starts the motor driving the compressor 237. By means already described, which description it is not necessary to repeat here in detail, the driving action of the motor is gradually increased. As the pressure caused thereby in conduit 17 rises, piston 263 is lifted in cylinder 265 and the arm 257 is swept clockwise over the contacts connected to field resistance 243 of the motor. The driving action of the motor is thereby decreased as the pressure rises in the conduit, for example, as one after another of the controlling valves for several transit tubes that may be in communication with the apparatus are closed and when all the valves are closed and there is no longer any outlet for the conduit, the arm swinging clockwise throws open switch 261 thus deënergizing solenoid 271. Bridge contact 275 thereupon falls, deënergizing solenoid 253 which permits shoe 247 to drop and the motor stops.

The devices for despatching a carrier from a branch station to the main station are similar but suitably modified to operate with pressure of negative instead of positive potential and the mechanism for holding door 29 by means of coil 31 is omitted.

Having thus described in detail the specific embodiment of my invention chosen for purposes of illustration and shown in the accompanying drawings, what I claim as new and desire to secure by Letters Patent is:—

1. In a system of the class described wherein a valve controls communication between a transit tube and a pressure conduit, a controlling means for the valve comprising a member secured thereto and subject to opposed pressures to move the same, means normally to admit equal opposed pressures to said member, a valve for modifying the pressure acting in one direction on said member, a magnet for opening said valve, a circuit for energizing said magnet including a circuit closer, a contactor which when open deënergizes the magnet and means moving with the main valve for throwing open said contactor.

2. In a system of the class described wherein a valve controls communication between a transit tube and a pressure conduit, a controlling means for the valve comprising a member secured thereto and subject to opposed pressures to move the same, means normally to admit equal opposed pressures to said member, a valve for modifying the pressure acting in one direction on said member, a magnet for opening said valve, a circuit for energizing said magnet including a circuit closer, a retaining circuit for the magnet, a contactor in said retaining circuit and means moving with the main valve for opening the contactor.

3. In a system of the class described wherein a valve controls communication between a transit tube and a pressure conduit, a controlling means for the valve comprising a member secured thereto and subject to opposed pressures to move the same, means normally to admit equal opposed pressures to said member, a valve for modifying the pressure acting in one direction on said member, electro-magnetic means for operating said valve, a circuit therefor, means moving with the main valve to break the circuit, means to delay return movement of said valve and operating means therefor comprising a pressure sensitive device balanced against the normal pressure of the transit tube when empty and means providing communication between said device and tube.

4. In a system of the class described wherein a valve controls communication between a transit tube and a pressure conduit, a controlling means for the valve comprising a member secured thereto and subject to opposed pressures to move the same, means normally to admit equal opposed pressures to said member, a valve for modifying the pressure acting in one direction on said member, electro-magnetic means for operating said valve, a circuit therefor, means moving with the main valve to break the circuit, and means responsive to the characteristic pressure of the transit tube when a carrier is in transit to delay return movement of said valve.

5. In a system of the class described wherein a valve controls communication between a transit tube and a pressure conduit, a controlling means for the valve comprising a pair of pressure chambers and a member secured to the valve movable by the differential of the pressures in said chambers, a duct between one chamber and a pressure conduit, a bleeding connection between said chambers, a valve controlling the pressure in one of the chambers, electro-magnetic means for operating said valve, a circuit therefor, means moving with the main valve to break the circuit and means independent of the electrical devices for retarding the return movement of said main valve.

6. In a system of the class described wherein a valve controls communication between a transit tube and a pressure conduit, a controlling means for the valve comprising a member secured thereto and subject to opposed pressures to move the same, means normally to admit equal opposed pressures to said member, a valve for modifying the pressure acting in one direction on said member, electro-magnetic means for operating said valve, a circuit therefor, means moving with the main valve to break the circuit, a second valve for similarly modifying the pressure acting in one direction on the member and means responsive to the characteristic pressure of the transit tube, when a carrier is in transit, to open the last-mentioned valve.

7. In a system of the class described wherein a valve controls communication between a transit tube and a pressure conduit, a controlling means for the valve comprising a member secured thereto and subject to opposed pressures to move the same, means normally to admit equal opposed pressures to said member, a valve for modifying the pressure acting in one direction on said member, means for temporarily opening said valve, a second valve for similarly modifying the pressure acting in one direction on the member and means responsive to the characteristic pressure of the transit tube when a carrier is in transit to open the last-mentioned valve.

8. In a system of the class described wherein a valve controls communication between a transit tube and a pressure conduit, electrically controlled means for effecting opening of the valve including a circuit having a contactor therein, means whereby the valve in opening throws open said contactor to deënergize the circuit and means responsive to the pressure conditions in the tube for keeping the valve open until transit therein is completed.

9. In a system of the class described wherein a valve controls communication between a transit tube and a pressure conduit, which transit tube is provided at one end with a door having an electric coil for magnetically positioning the same, electrically controlled means for effecting opening of the valve including a circuit having a contactor therein, means whereby the valve in opening throws open the contactor to deënergize the circuit, means to delay closing of the valve and means operated by said valve in its opening and closing movement for energizing and deënergizing said electric coil.

10. In a system of the class described wherein a valve controls communication between a transit tube and a pressure conduit, a pressure sensitive device for moving the valve, operating means to control the pressure on said device to operate the same and thereby to move the valve, and a mechanism governed by the pressure in the system and operating under the characteristic pressure conditions due to the presence of a carrier in the transit tube to maintain those pressure conditions in said pressure-sensitive device which are effective to move the valve.

11. In a system of the class described wherein a valve controls communication between a transit tube and a pressure conduit, a controlling means for the valve comprising a member secured thereto and subject to opposed pressures, means normally to admit equal opposed pressures to said member, a valve for modifying the pressure acting in one direction on said member thereby to move the same, means for temporarily opening said valve, a second valve for similarly modifying the pressure, a pressure sensitive device for opening said valve balanced against the normal pressure of the transit tube when empty and means providing communication between said device and the tube.

12. In a system of the class described wherein a valve controls communication between a transit tube and a pressure conduit, a controlling means for the valve comprising a pair of pressure chambers and a member secured to the valve movable by the differential of the pressures in said chambers, a duct between one chamber and a pressure conduit, a bleeding connection between said chambers, operating means for placing the other chamber temporarily in communication with the atmosphere independently of pressure conditions in the system and means to maintain said communication comprising a pressure sensitive controlling device balanced against the normal pressure of the transit tube when empty and means providing communication between said device and the tube.

13. In a pneumatic despatch system wherein a device is moved to establish and disestablish a carrier-propelling flow of air in a transit tube means for moving such device comprising an element connected to said device and subject to opposed pressures, means normally to equalize such pressures, means to apply independently of pressure conditions in the system an abnormal pressure to said element to move the same and a pressure sensitive device responsive to the characteristic pressure conditions in the tube due to the presence of a carrier therein to maintain such abnormal pressure.

14. In a pneumatic despatch system wherein a device is moved to establish and disestablish a carrier-propelling flow of air in a transit tube means for moving such device comprising an element connected to said device and subject to opposed pressures, means normally to equalize such pressures, two valves to modify the pressure acting in one direction on said element thereby to move the same, means for operation when a carrier is introduced for opening one valve and a pressure sensitive device responsive to the characteristic pressure conditions in the tube due to the presence of a carrier therein for opening the second valve.

15. In a pneumatic despatch system wherein a device is moved to establish and disestablish a carrier-propelling flow of air in a transit tube means for moving such device comprising an element connected to said device and subject to opposed pressures, means normally to equalize such pressures, two valves to modify the pressure acting in one direction on said element thereby to move the same, means for operation when a carrier is introduced for opening one valve, means consequent on the movement of said device to flow-establishing position to reclose said valve and a pressure sensitive device responsive to the characteristic pressure conditions in the tube due to the presence of a carrier therein for opening the second valve.

16. In a pneumatic despatch system wherein a device is moved to establish and disestablish a carrier-propelling flow of air in a transit tube means for moving such device comprising an element connected to said device and subject to opposed pressures, means normally to equalize such pressures, two valves to modify the pressure acting in one direction on said element thereby to move the same, an electro-magnetic mechanism for opening one of said valves, means for deënergizing said mechanism on the movement of said device to flow-establishing position and a pressure sensitive device responsive to the characteristic pressure conditions in the tube due to the presence of a carrier therein for opening the second valve.

17. In a pneumatic despatch system wherein a device is moved to establish and disestablish a carrier-propelling flow of air in a transit tube means for moving such device comprising an element connected to said device and subject to opposed pressures, a restricted connection for gradually equalizing such pressures, a momentarily opening valve to effect relatively sudden alteration of one pressure thereby to move said element, a second valve for maintaining such altered pressure, and a pressure sensitive device responsive to the characteristic pressure conditions in the tube due to the presence of a carrier therein for working said second valve.

18. In a pneumatic despatch system wherein a device is moved to establish and disestablish a carrier-propelling flow of air in a transit tube means for moving such device comprising an element connected to said device and subject to opposed pressures, a restricted connection for gradually equalizing said pressures, a valve to effect relatively sudden alteration of one pressure thereby to move said element, means for operation when a carrier is introduced for opening such valve and a pressure sensitive device responsive to the characteristic pressure conditions in the tube due to the presence of a carrier therein for maintaining such altered pressure.

In testimony whereof, I have signed my name to this specification.

JAMES G. MACLAREN.